United States Patent [19]

Porth et al.

[11] 3,954,453

[45] May 4, 1976

[54] RECOVERY OF COPPER FROM AMMONIACAL COPPER SULFATE SOLUTION

[76] Inventors: Luis de la Pena Porth; Luis Espinosa de Leon; Raymundo Delgado; Tomas Perez, all of Cantil No. 136, Mexico City 20, Mexico

[22] Filed: July 24, 1974

[21] Appl. No.: 491,454

[30] Foreign Application Priority Data

Sept. 25, 1973 Mexico .............................. 146375

[52] U.S. Cl. ................................... 75/117; 75/108; 423/36; 423/512 A
[51] Int. Cl.² ........................................ C22B 15/12
[58] Field of Search ............... 75/117, 108; 423/36, 423/512

[56] References Cited
UNITED STATES PATENTS 3,148,051   9/1964   Chupungco et al. .................... 75/117

3,228,765   1/1966   Chumpungco et al. ................ 75/117

*Primary Examiner*—G. Ozaki
*Attorney, Agent, or Firm*—Pennie & Edmonds

[57] ABSTRACT

Metallic copper is recovered from an ammoniacal copper sulfate solution by treating such solution with sulfur dioxide to form a precipitate of copper ammonium sulfite. The crystals are suspended in an acidic solution containing initially from 20 to 75 grams per liter of sulfuric acid, which preferably contains a substantial concentration (up to saturation) of ammonium sulfate, said solution containing from 40% to 70% by weight of such crystals, and the resulting suspension is heated at 140°C. to 170°C. and at 150 to 220 psi. until substantially all the copper ammonium sulfite has been converted to metallic copper. The metallic copper thereafter is separated from the residual solution.

7 Claims, No Drawings

RECOVERY OF COPPER FROM AMMONIACAL COPPER SULFATE SOLUTION

BACKGROUND OF THE INVENTION

Numerous chemical investigations have resulted in alternative methods to recover copper from both acid and ammoniacal solutions. Among those which are pertinent to the present invention are:
  a. A process (U.S. Pat. No. 723,949) described by George D. van Arsdale which consists of saturating copper sulfate solutions with sulfur dioxide and submitting these solutions to the action of heat and pressure to partially precipitate the copper content and form a proportional amount of sulfuric acid.
  b. A process (German Pat. No. 189,974) described by Lucian Jumau which consists of precipitating copper sulfite and decomposing it with sulfuric acid. Also, a process (German Pat. No. 204,673) described by Lucian Jumau in which copper sulfite is treated with water in an autoclave at temperatures from 140° to 170° Centigrade.
  c. A process (U.S. Pat. Nos. 3,148,051 and 3,228,765) described by Estanislao J. Chupungco, et al., which consists of treating copper ammine solutions with sulfur dioxide to precipitate a copper ammonium sulfite which is subsequently treated with sulfuric acid or oxygen to obtain metallic copper, copper sulfate, and/or copper oxide together with ammonium sulfate and sulfur dioxide.

It should be pointed out that, although the majority of these processes were developed some time ago, they have not been applied commercially due to the low efficiency with which metallic copper is produced. None of these processes lead to recovery, as metallic copper, or more than about 50% to 80% of the copper content of the copper sulfite (or sulfate). Thus, they are characterized by costly and difficult recirculation of copper sulfate solutions or treatment of other copper components produced. For example, the efficiency in converting copper sulfite to metallic copper using sulfuric acid (Jumau Process) varies from 33% to 40%, the efficiency in converting copper sulfite to metallic copper using heat and pressure (Jumau Revised Process) is between 70 and 75%, the efficiency in converting copper sulfate to metallic copper (van Arsdale Process) is between 50% and 60%, and the efficiency of the conversion of copper ammonium sulfite to metallic copper (E. J. Chupungco Process) with sulfuric acid is from 50% to 60% and with oxygen is from 30% to 40%.

STATEMENT OF THE INVENTION

The present invention provides an improved process for the production of metallic copper from a copper ammonium sulfate solution by treating such solution with sulfur dioxide to form a precipitate of copper ammonium sulfite crystals. The crystals are then suspended in an acidic solution containing initially from 20 to 75 grams per liter of sulfuric acid, said suspension containing initially from 40% to 70% by weight of such crystals. The resulting suspension is heated at a temperature in the range from 140°C. to 170°C. at a pressure in the range from 150 to 220 psi. until substantially all the copper ammonium sulfite has been converted to metallic copper; and thereafter the metallic copper is separated from the residual solution.

Preferably the residual solution from a previous decomposition of copper ammonium sulfite to metallic copper is utilized as the solution in which a further quantity of copper ammonium sulfite crystals is suspended and heated to convert the crystals to a further quantity of metallic copper. The preferred weight ratio of copper ammonium sulfite crystals to liquid in the suspension subjected to heating under pressure to form metallic copper is substantially 1:1 (50% by weight of crystals in the suspension). The crystals preferably are dried to less than 5% moisture at a temperature below 120°C. prior to suspending them in the acidic solution. Such solution preferably contains from 25 to 70 grams per liter of sulfuric acid, and preferably also is substantially saturated with ammonium sulfate.

DETAILED DESCRIPTION OF THE INVENTION

This invention provides improvements in a procedure to obtain, with high efficiency, pure copper from copper ammonium sulfite. The overall procedure in which the invention finds its place involves the following steps:
  1. Preparation of an ammoniacal solution of copper in which this element is present as copper tetrammine sulfate or copper tetrammine carbonate ($Cu(NH_3)_4SO_4$ or $Cu(NH_3)_4CO_3$) the pH of which is advantageously between 9.5 and 10.5.
  2. Treating such solution with sulfur dioxide to effect precipitation of crystals of copper ammonium sulfite ($Cu\ NH_4SO_3$), separating this precipitate from the resulting solution of ammonium sulfate, and preferably drying the crystals to below 5% moisture at a temperature below 120°C.
  3. Treating an aqueous sulfuric acid suspension of the dried copper ammonium sulfite obtained in the previous step in closed containers under heat and pressure to effect efficient decomposition of this compound to metallic copper, ammonium sulfate, sulfuric acid, and sulfur dioxide.
  4. Separating and washing of the metallic copper and preparing it for market.
  5. Recovering the ammonium sulfate, sulfuric acid, and sulfur dioxide produced in the decomposition of the copper ammonium sulfite.

Step (1) above is an operation which is very well known in the art, and its practical execution depends a great deal on the raw material available. For these reasons, and since it is not part of the present invention, it is considered unnecessary to describe it in detail.

Step (2), involving the precipitation of copper ammonium sulfite, is essentially a known chemical reaction that has been studied previously and is found described in advanced textbooks on chemical science. This reaction has also been described in detail, although excluding its stoichiometry, by Chupungco et al.

We have found that in order to obtain high efficiencies in the decomposition of the copper ammonium sulfite, it is desirable for the copper ammonium sulfite to be in the form of well-defined, transparent hexagonal crystals with a median size of about 200 microns. The copper content of this salt preferably should be between 39% to 43% by weight. The theoretical composition of $CuNH_4SO_3$ is 39.4%, but the precipitated crystals may contain substantially more copper because they may in part be composed of a copper sulfite (probably $Cu_2SO_3 \cdot CuSO_3 \cdot 2H_2O$, theoretically 49.3% copper).

It is also desirable, for high efficiency of copper recovery, for the crystals to be well dried (below 5% moisture and preferably below 3% moisture), and to effect such drying at a temperature not exceeding 120°C.

The precipitation of copper ammonium sulfite can be expressed according to the following equation:

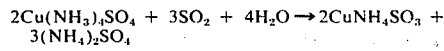
$$2Cu(NH_3)_4SO_4 + 3SO_2 + 4H_2O \rightarrow 2CuNH_4SO_3 + 3(NH_4)_2SO_4$$

Excess ammonia in the solution reacts in the presence of oxygen with additional sulfur dioxide to produce ammonium sulfate according to the following reaction:

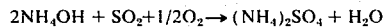
$$2NH_4OH + SO_2 + 1/2O_2 \rightarrow (NH_4)_2SO_4 + H_2O$$

Step (3), which involves the thermal decomposition of copper ammonium sulfite crystals to produce metallic copper, ammonium sulfate, sulfuric acid, sulfur dioxide, substantially without formation of copper sulfate or copper sulfide, is the step with which the invention is mainly concerned.

From our experience, success in obtaining high efficiency in the decomposition of copper ammonium sulfite to produce high purity copper depends on several factors. Those of major importance are:
 a. Dilution of the suspension in which decomposition takes place;
 b. Composition of the suspension in wich decomposition takes place; and
 c. Decomposition temperature and pressure.

Concerning the dilution of the suspension, it can be pointed out that decomposition to some extent will occur at all dilutions in the range from less than 10% by weight of sulfite crystals to more than 90% by weight of sulfite crystals. However, the best results are obtained with suspensions comprised of between 40% and 70% by weight of copper ammonium sulfite. Outside this range the proportion of sulfite decomposed to metallic copper is significantly diminished. In the majority of cases, 50% by weight of crystals in the suspension is preferred.

The chemical composition of the solution in which the thermal decomposition of copper ammonium sulfite takes place also is important from the standpoint of efficiency. In particular, the sulfuric acid content of the liquid phase of the suspension in wich decomposition takes place should initially be from 20 to 75 grams per liter. The highest efficiencies generally are obtained using a solution containing both sulfuric acid and ammonium sulfate, such as solutions produced in previous decomposition reactions which have become substantially saturated with ammonium sulfate. The optimum quantity of free sulfuric acid appears to be in the range from 25 to 70 grams per liter, and preferably the solution is substantially saturated in ammonium sulfate.

The temperature and pressure at which decomposition of the copper ammonium sulfite crystals is effected are also important factors for obtaining metallic copper at high efficiency. The temperature at which the decomposition reaction takes place varies according to factors such as the type and characteristics of the sulfite, quantity and concentration of sulfuric acid and other solutes in the solution, etc. Generally, it can be said that the preferred temperature range for the decomposition reaction is from 140°C. to 170°C.

Under appropriate conditions the decomposition reaction generates a large quantity of sulfur dioxide which results in an increase of pressure within the autoclave. It has been observed that control of pressure is important to the quality of the copper product as well as to the efficiency of its production. If the pressure does not reach a minimum value of about 150 psi. the reaction is incomplete. On the other hand, if the pressure exceeds a maximum value of about 220 psi., part of the copper ammonium sulfite reacts to form copper sulfide. These pressures are considerably higher than the equilibrium pressures at the preferred temperatures and result from the generation of sulfur dioxide as well as water vapor as a result of heating the charge in the autoclave. Pressure can be controlled readily by venting sulfur dioxide and water vapor as required from the autoclave.

The reactions that take place during autoclaving proceed rapidly once the stated temperature, pressure and other conditions have been established. We have observed experimentally that the autoclaving treatment can generally be terminated within ten minutes after the proper temperature and pressure have been achieved.

In summary, the thermal decomposition of copper ammonium sulfite, which constitutes the essential part of the present invention, can be made to occur in closed containers at controlled temperatures and pressures to produce high purity copper in high yield providing the following requisites are met:
 a. High quality and adequate physical and chemical characteristics, and proper drying, of the copper ammonium sulfite crystals.
 b. Correct dilution and proper composition of the suspension in which the decomposition reaction takes place.
 c. Appropriate control of temperature and pressure.

By taking these factors into consideration, it is possible to reach efficiencies in the range from 98.0 to 99.5% in the decomposition of copper ammonium sulfite crystals to produce high grade metallic copper and a solution containing ammonium sulfate and sulfuric acid in the proper proportions for treating a subsequent charge of sulfite.

Obviously, the foregoing requirements for the efficient decomposition of copper ammonium sulfite can be achieved in a continuous process, by continuously injecting a suspension of sulfites and solution into a heated, closed container. Metallic copper, sulfuric acid and ammonium sulfate solution, and sulfur dioxide may be withdrawn either continuously or intermittently.

The process may also be carried out discontinuously, as a batch type operation.

The final operations of the process, such as separation of the copper from solution, washing of the copper and preparing it for market, and the recovery of the ammonium sulfate, sulfuric acid and sulfur dioxide, are operations which do not form a part of this invention and can be performed by known methods.

EXAMPLES OF THE PROCESS:

For the purpose of carrying out the tests described below, sulfur dioxide was passed into a solution of copper tetrammine sulfate at a pH of 10, resulting in precipitation of crystalline copper ammonium sulfite. The sulfite precipitate was separated from the residual solution by filtration, and was dried without washing to 3% moisture by heating in air at a temperature of 120°C. X-ray diffraction analysis showed the product to be homogeneous, well-crystallized $CuNH_4SO_3$ plus some $Cu_3(SO_3)_2\cdot 2H_2O$. Microscopic examination revealed the crystals to be colorless, transparent hexagonal plates with average dimensions of 200 microns in diameter by 24 microns thick. The copper content of the sulfite crystals was found to be 43.0%. This product was used in the various tests described below.

At the conclusion of each test described below, a determination was made of the portion of copper recovered in the solid phase, but the analytical procedure used did not differentiate between metallic and non-metallic copper. In those cases where essentially all of the solid phase was metallic copper, the amount of copper so determined is set forth below as "% copper precipitated as metal". In all other cases a qualitative explanation of the composition of the solid phase is given.

TEST SERIES I

Three portions of the dried crystals were suspended in water (acidified to contain about 20 g/l $H_2SO_4$) at three dilutions, and each suspension was heated in an autoclave at 160°C. and 190° psi. until decomposition of the sulfite crystals to metallic copper had proceeded as far as it would go. The tests are summarized in the following Table I:

TABLE I

|  | A | B | C |
|---|---|---|---|
| $Cu(NH_4)SO_3$ (gms.) | 500 | 500 | 250 |
| Water (cc.) | 75 | 500 | 1250 |
| Dilution Ratio | 0.15:1 | 1:1 | 5:1 |
| % Cu precipitated as metal | — | 99.46 | 98.88 |

In test A the sulfite was not fully decomposed and the solid phase at the conclusion of the autoclave operation still contained a substantial proportion of the undecomposed sulfite crystals. This test series demonstrates that if the solution is at a dilution as low as 0.15:1 (about 87% by weight solids) considerable copper remains undecomposed during the autoclave treatment. Optimum decomposition occurs when the solid content of the suspension is in the range from 40% to 70% by weight, as indicated by test B, in which the suspension contained 50% by weight solids. In test C, at about 17% by weight solids, the percentage of copper recovered in the solid phase has diminished from the maximum yield of test B.

TEST SERIES II

Four portions of the dried copper ammonium sulfite crystals were suspended in a sulfuric acid solution containing varying proportions of acid. Each suspension was heated in an autoclave at 190 psi, and at about 160°C. until decomposition of the sulfite crystals had proceeded as far as it would go. The tests are summarized in Table II:

TABLE II

|  | A | B | C | D |
|---|---|---|---|---|
| $CuNH_4SO_3$ (gms.) | 500 | 500 | 500 | 500 |
| Water (cc.) | 500 | 500 | 500 | 500 |
| $H_2SO_4$, initial (g/l) | 0 | 50 | 75 | 100 |
| % Cu precipitated as metal | — | 97.06 | 98.84 | 93.74 |

In test A the sulfite was not fully decomposed and the solid phase at the conclusion of the test still contained a substantial proportion of undecomposed sulfite crystals. This test series demonstrates that if the acid content of the initial solution is below the lower limit of about 20 g/l or exceeds the upper limit of about 75 g/l, the amount of copper decomposed falls off substantially. It is to be noted that the amount of acid initially added is augmented during the autoclaving treatment by acid formed during the decomposition reaction.

TEST SERIES III

Four portions of the dried copper ammonium sulfite crystals were suspended in a water solution initially containing 60 g/l $H_2SO_4$ and the resulting suspensions were autoclaved at increasing pressures and temperatures until decomposition of the sulfite crystals to metallic copper had proceeded as far as it would go. These tests are summarized in Table III:

Table III

|  | A | B | C | D |
|---|---|---|---|---|
| $CuNH_4SO_3$ (gms.) | 500 | 500 | 500 | 500 |
| 12 g/l $H_2SO_4$ solution(cc) | 500 | 500 | 500 | 500 |
| Autoclave pressure (psi.) | 150 | 180 | 210 | 300 |
| Autoclave temp. (°C) | 154 | 162 | 166 | 174 |
| % Cu precipitated as metal | 96.17 | 97.30 | 97.50 | — |

At the high pressure of 300 psi (test D) most of the copper ammonium sulfite decomposed, but to some extent it formed copper sulfide rather than metallic copper in the solid phase. These tests demonstrate that excellent metal recovery is obtained when the pressure and temperature of the autoclaving operation are within the preferred limits of 150 to 220 psi. and 140 to 170°C., but at higher pressures and temperatures there is loss of copper metal by conversion of the sulfite complex to copper sulfide.

TEST SERIES IV

In these tests successive portions of 500 grams each of the dried copper ammonium sulfite crystals were slurried with the product from a previous autoclaving operation to form suspensions containing one part by weight of sulfite crystals per part by weight of liquid, and the resulting suspension was subjected to autoclave decomposition. In the first group of tests a first portion of the crystals were suspended in water and autoclaved, then a second portion of the crystals was suspended in the solution from the first autoclaving operation without separating the solid residue and this suspension was autoclaved, and then a third portion of crystals was suspended in the pulp from the second autoclaving operation and was then subjected to a third autoclaving operation. At the conclusion of the first autoclaving operation the solid residue contained substantial undissolved sulfite owing to the initially nil acid content of the liquid phase, but as acid formed by the decomposition reaction increased in the solution, all this sulfite decomposed in the later autoclavings. At the end of the third operation, the solid phase was substantially all copper metal. Overall a recovery of 99.60% of the copper was recovered in metal form.

A second group of tests was similarly performed, but was extended through five successive autoclaving operations rather than three. The solution from the fifth autoclaving had crystals of ammonium sulfate separating from it, showing that the solution had become saturated in ammonium sulfate. The overall recovery of copper in metal form at the conclusion of the fifth autoclaving was 99.64%.

It was observed in this second group of tests that the sulfuric acid content of the solution progressively increased through the first several autoclavings to a maximum of about 70 grams per liter (as it did also in the first group of tests), and then diminished substantially, to about 50 grams per liter, in the solution from the fifth autoclaving. We are unable to explain why such an increase followed by a decrease in the acid content should occur.

In this test series the autoclaving pressure was in each case 190 psi and the autoclaving temperature was in each case from 140°C to 160°C. Sulfur dioxide formed during the decomposition reaction was allowed to escape from the autoclave to prevent a building of pressure beyond the chosen value of 190 psi.

These tests demonstrate that the solution containing sulfuric acid and ammonium sulfate produced by the decomposition reaction (the latter in concentrations up to saturation) constitutes an excellent vehicle in which to suspend the copper ammonium sulfite crystals preparatory to decomposing them by autoclave treatment, and that the removal of previously precipitated copper metal is not necessary.

Copper metal produced by decomposition of copper ammonium sulfite crystals in accordance with the invention is of very high purity. None of the impurities customarily found with copper in the form of its ores or as scrap will follow it through the successive operations of ammoniacal leaching, precipitation with sulfur dioxide, and then decomposition at elevated temperature and pressure to metallic copper.

We claim:

1. The method of producing metallic copper which comprises treating an ammoniacal copper sulfate solution with sulfur dioxide to form a precipitate of copper ammonium sulfite crystals, separating said crystals from the solution, suspending such crystals in an acidic solution containing initially from 20 to 75 grams per liter sulfuric acid, said suspension containing from 40% to 70% by weight of such crystals, heating the resulting suspension at a temperature in the range from 140° to 170°C. at a pressure in the range from 150 to 220 psi until substantially all the copper in the copper ammonium sulfite has been converted to metallic copper, and separating the metallic copper from the residual solution.

2. The method according to claim 1 wherein residual solution from a previous decomposition of copper ammonium sulfite to metallic copper is utilized as the solution in which a further quantity of copper ammonium sulfite crystals is suspended and heated to convert such crystals to a further quantity of metallic copper.

3. The method according to claim 1 wherein the weight ratio of dried copper ammonium sulfite crystals to liquid in the suspension subjected to heating under pressure to form metallic copper is substantially 1:1.

4. The method according to claim 1 wherein the copper ammonium sulfite crystals are dried to less than 5% moisture at a temperature not exceeding 120°C. prior to suspending than in the acidic solution.

5. The method according to claim 1 wherein the acidic solution contains from 25 to 70 grams per liter of sulfuric acid.

6. The method according to claim 1 wherein the solution in which the copper ammonium sulfite crystals are suspended is substantially saturated with ammonium sulfate.

7. The method of producing metallic copper which comprises treating an ammoniacal copper sulfate solution with sulfur dioxide to form a precipitate of copper ammonium sulfite crystals, separating the crystals from the solution, drying the crystals to below 3% moisture at a temperature not exceeding 120°C., suspending the dried crystals in a substantially equal weight of an acidic solution substantially saturated with ammonium sulfate and containing initially from 25 to 70 grams per liter sulfuric acid, heating the resulting suspension at a temperature in the range from 140° to 170°C. at a pressure in the range from 150 to 220 psi until substantially all the copper in the copper ammonium sulfite has been converted to metallic copper, and separating the metallic copper from the residual solution.

* * * * *